United States Patent [19]
Hattori

[11] Patent Number: 5,847,890
[45] Date of Patent: Dec. 8, 1998

[54] MAGNETIC DISK APPARATUS AND A THERMAL ASPERITY COMPENSATION METHOD OF THE SAME

[75] Inventor: Masakatsu Hattori, Tokyo, Japan

[73] Assignee: Kabushiki Kaisha Toshiba, Kanagawa-ken, Japan

[21] Appl. No.: 786,327

[22] Filed: Jan. 23, 1997

[30] Foreign Application Priority Data

Jul. 31, 1996 [JP] Japan .................................. 8-201685

[51] Int. Cl.⁶ ...................................................... G11B 5/09
[52] U.S. Cl. .............................................. 360/51; 360/67
[58] Field of Search .................................... 327/513, 311, 327/58, 179; 360/46, 48, 67, 113, 78.13, 73.03; 371/40.3, 10.2; 711/165

[56] References Cited

U.S. PATENT DOCUMENTS

| | | | |
|---|---|---|---|
| 4,777,542 | 10/1988 | Ozaki | 360/48 |
| 4,914,398 | 4/1990 | Jove et al. | 360/46 X |
| 5,233,482 | 8/1993 | Galbraith et al. | 360/46 |
| 5,708,537 | 1/1998 | Galbraith et al. | 360/46 |
| 5,715,110 | 2/1998 | Nishiyama et al. | 360/67 |

FOREIGN PATENT DOCUMENTS 7-320216   12/1995   Japan .

*Primary Examiner*—Nabil Hindi
*Assistant Examiner*—Patrick Wamsley
*Attorney, Agent, or Firm*—Limbach & Limbach L.L.P.

[57] ABSTRACT

A magnetic disk apparatus includes a reproducing circuit for reproducing a signal recorded in a medium, a reproduced signal processing controller having a TA compensation mode to effectively control reproduced signal processing in accordance with generation of TA, a reproduced signal processor for processing the reproduced signal output from the reproducing circuit under the control of the reproduced signal processing controller, and an HDC. The reproduced signal processing controller has a TA detection level setting means for setting the TA detection level, a TA detecting means for detecting a TA component from the reproduced signal by using the detection level set by the TA detection level setting means, a resistance value setting means for setting the resistance value of the rheostat of a TA cancel filter, an AGC hold time setting means for setting the TA hold time of an AGC, a PLL hold time setting means for setting the TA hold time of a PLL, a sync byte detecting means for detecting sync byte data in accordance with the format in which a plurality of sync byte data are arranged to be separated from each other, and a central processing unit for integrally controlling these means. When the TA detecting means detects generation of the TA, the reproduced signal processing controller shifts to the TA compensation mode and controls the reproduced signal processor in accordance with an operation defined in this mode.

13 Claims, 13 Drawing Sheets

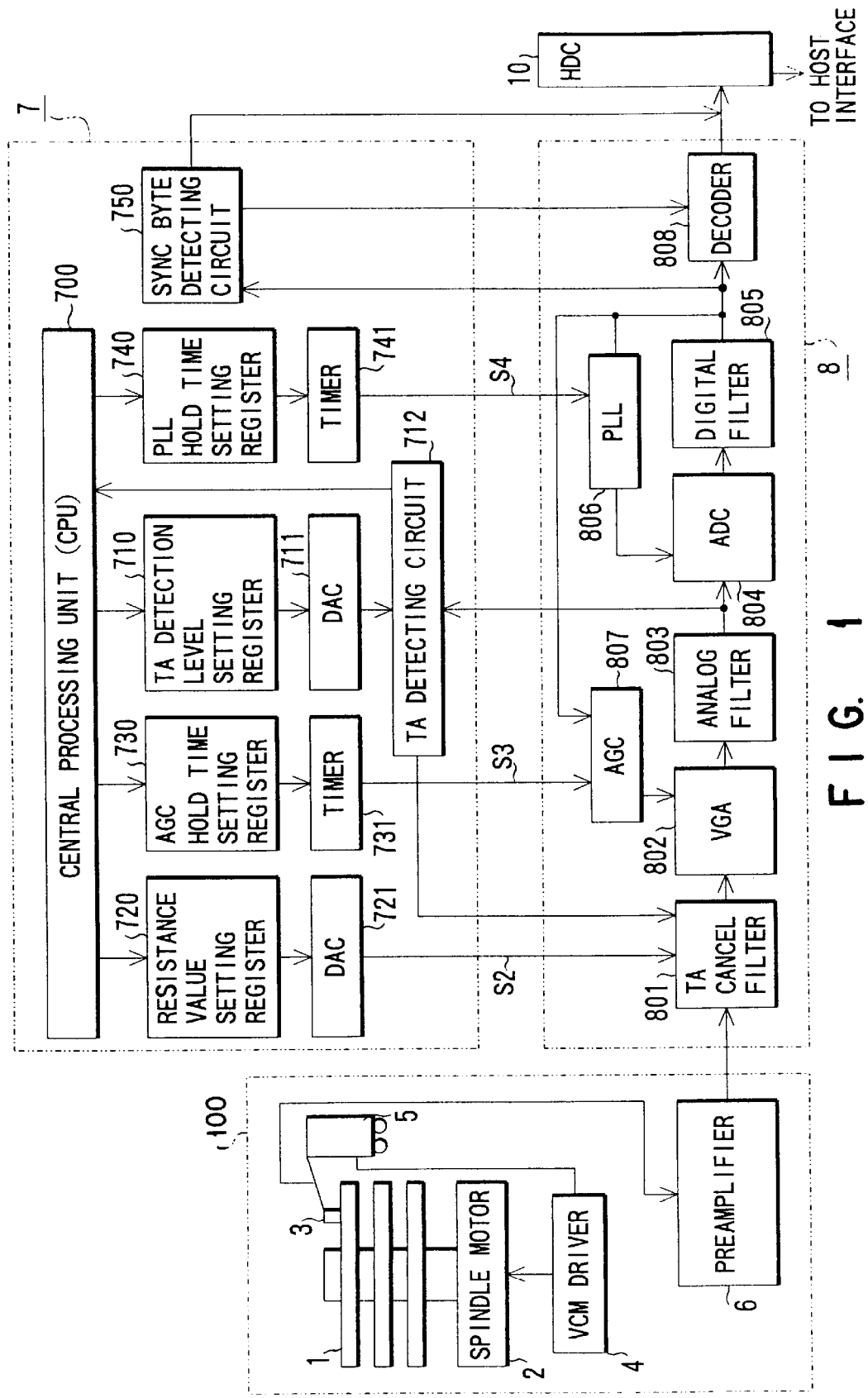
F I G. 1

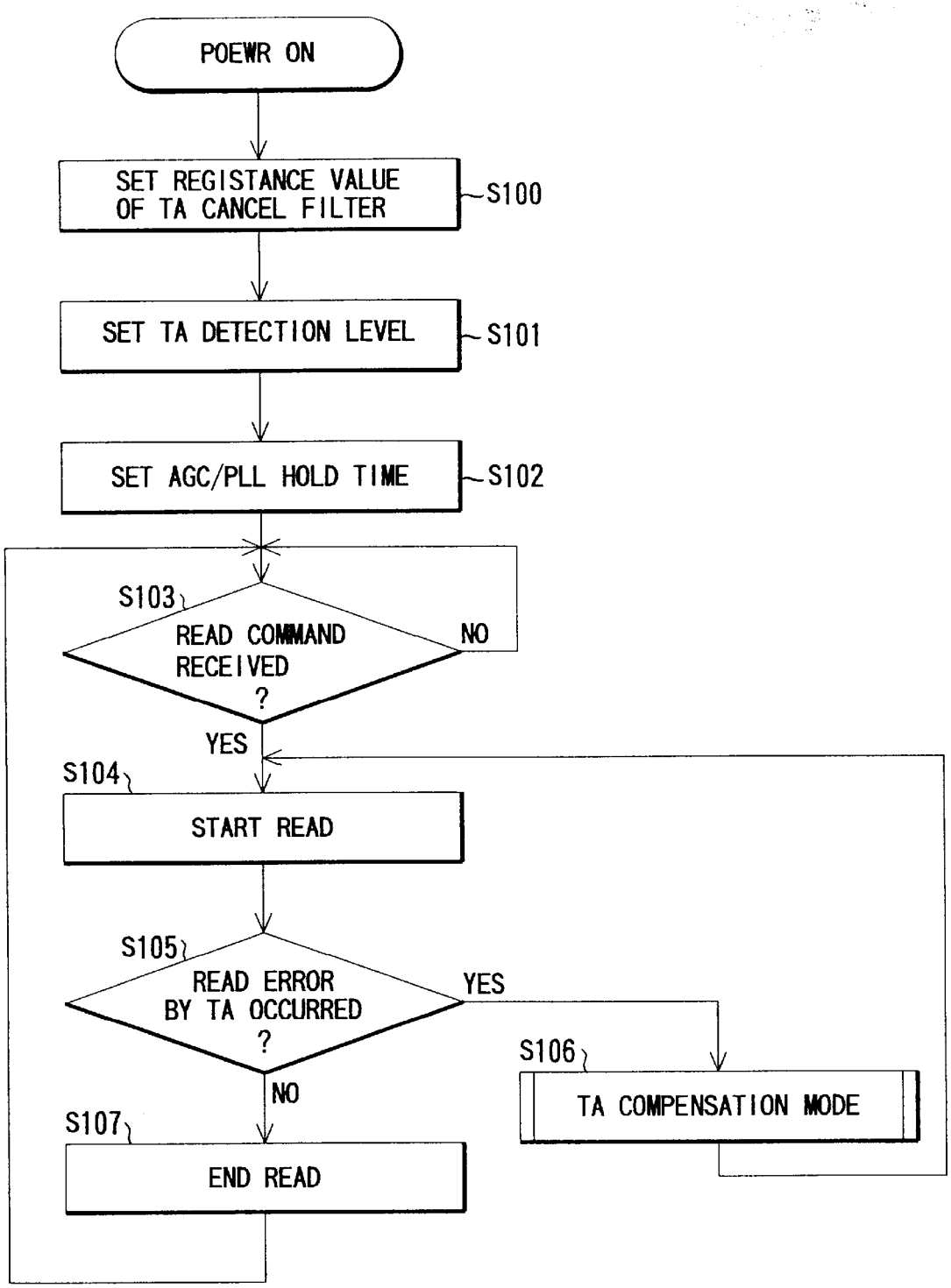
F I G. 2

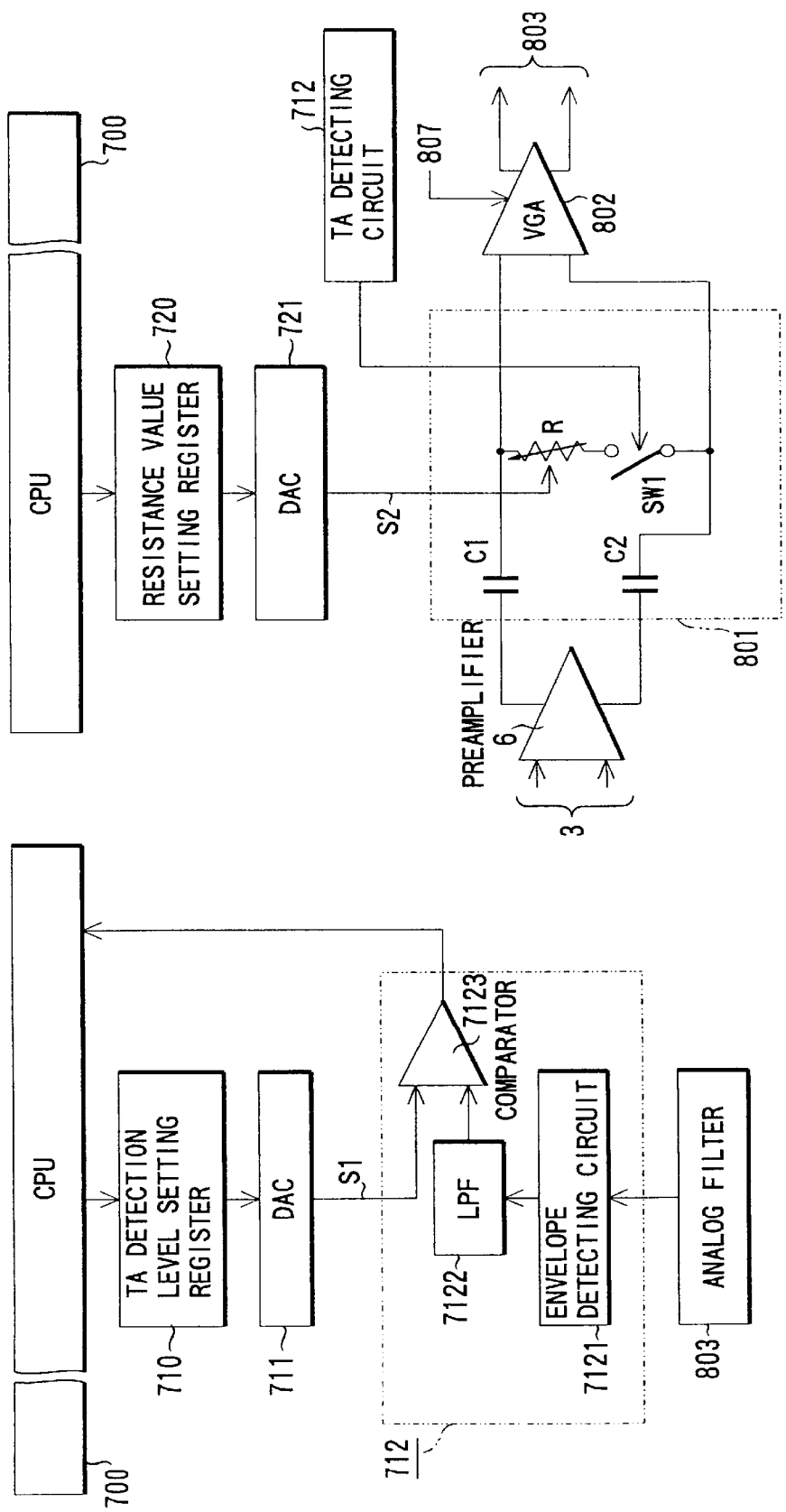
F I G. 7
F I G. 3

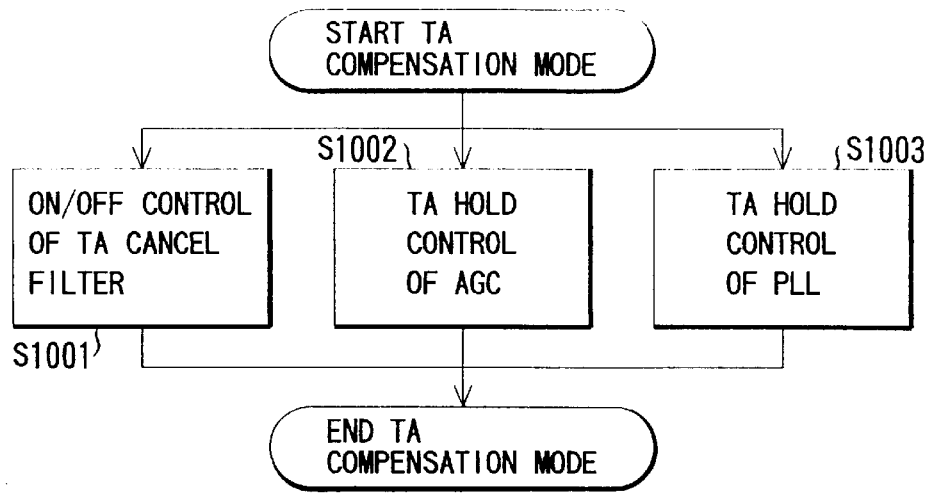
F I G. 6
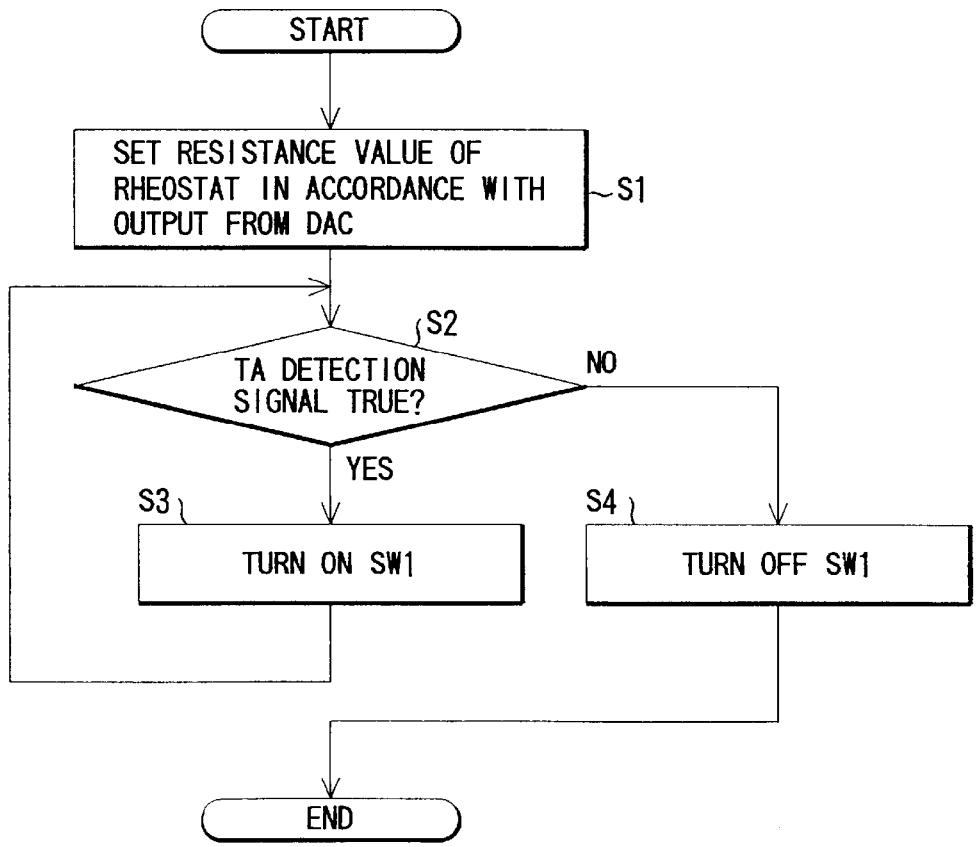
F I G. 9

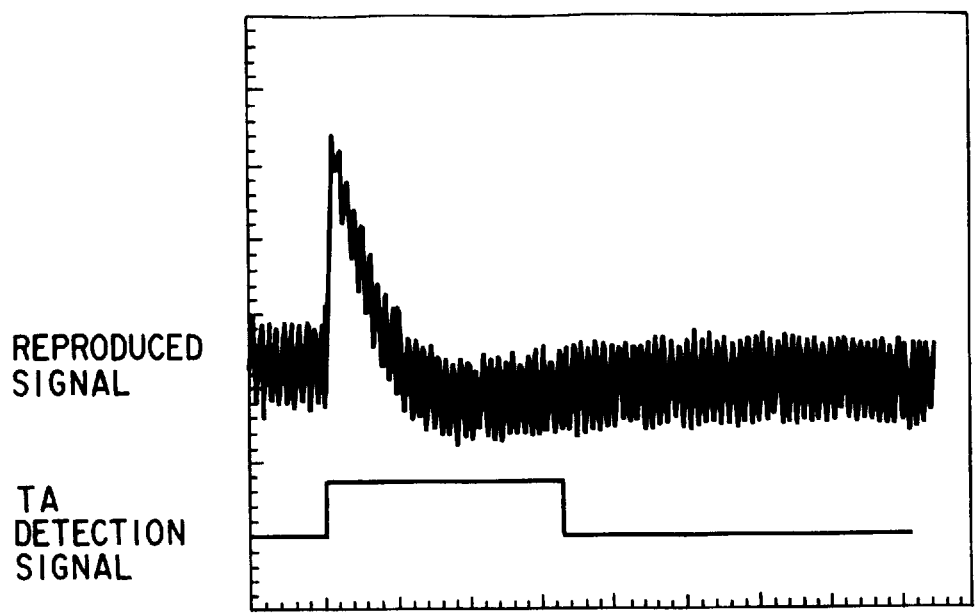
F I G. 8A
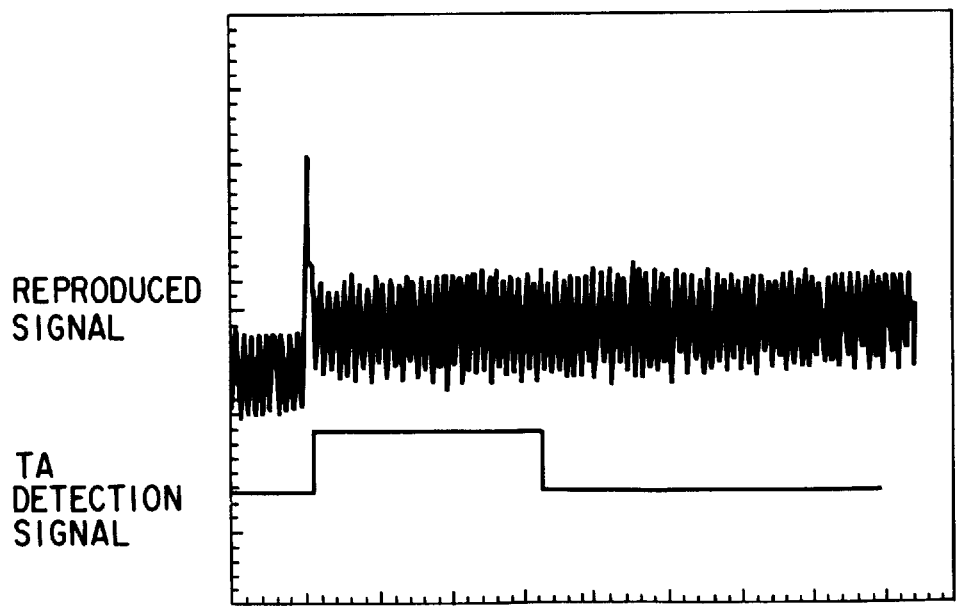
F I G. 8B

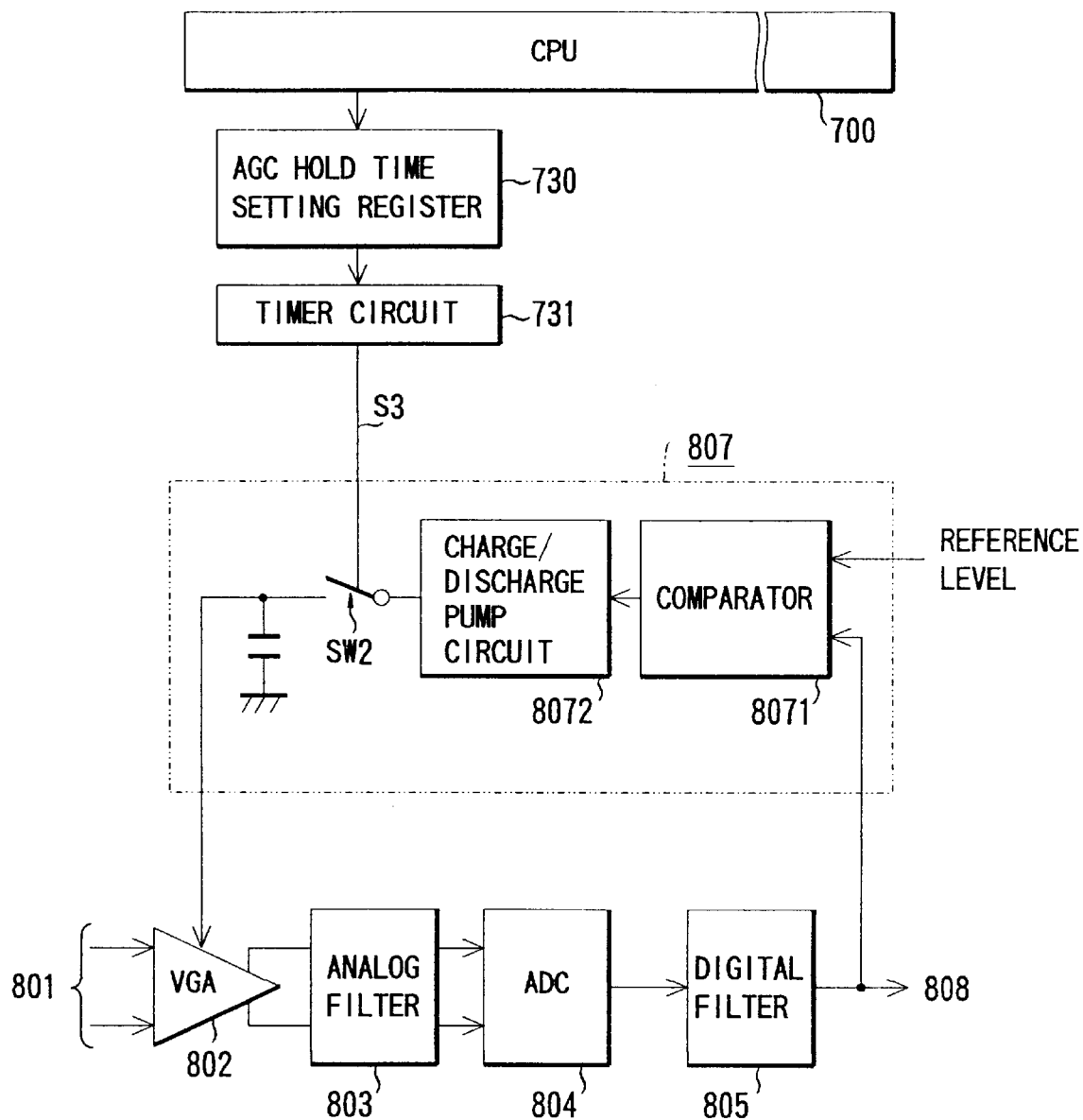
F I G. 10

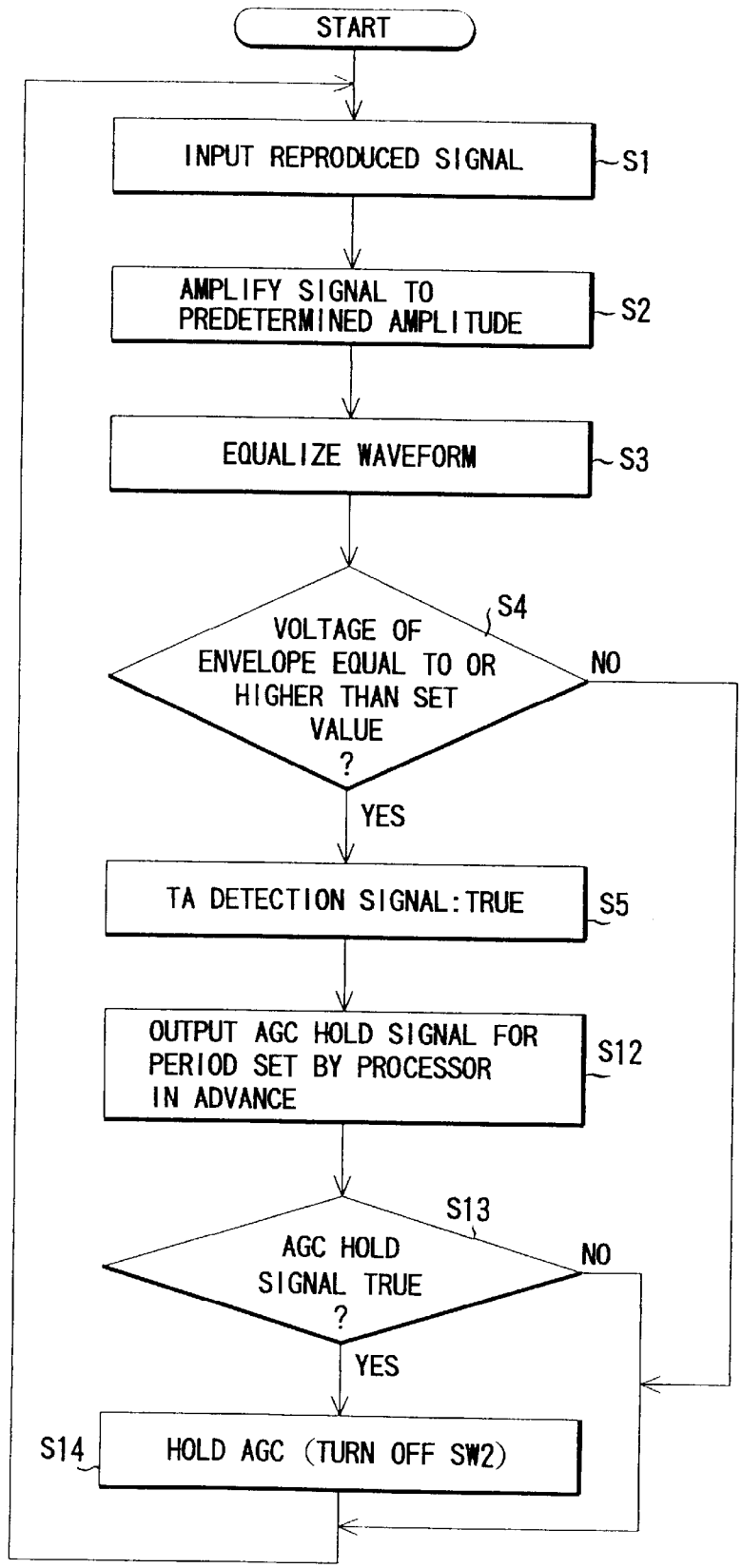
F I G. 11

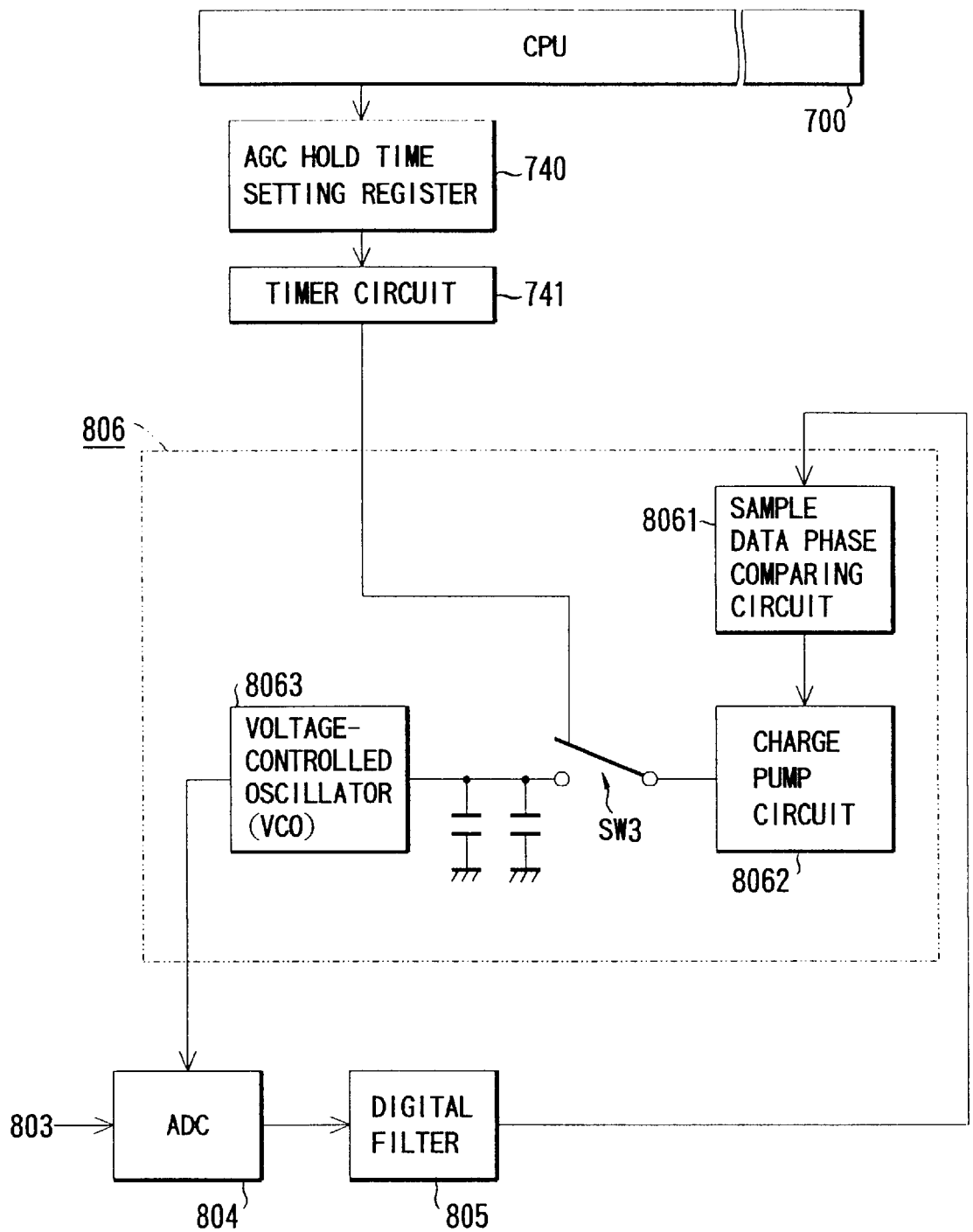
F I G. 12

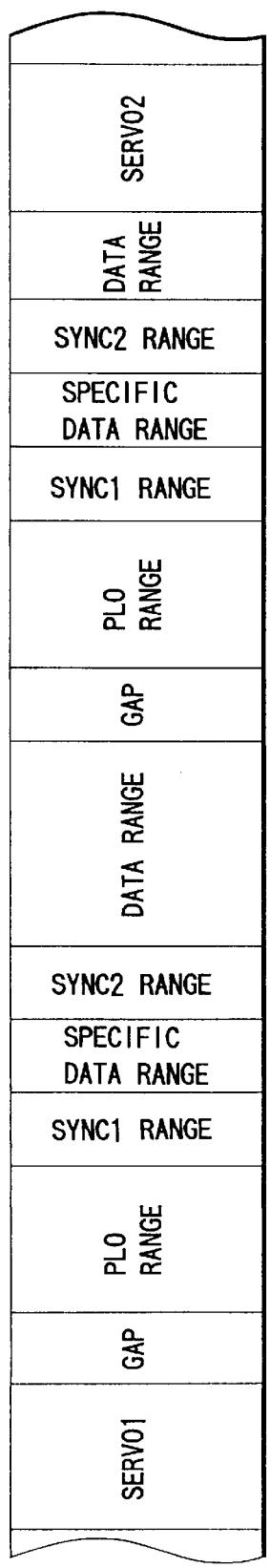
F I G. 14A
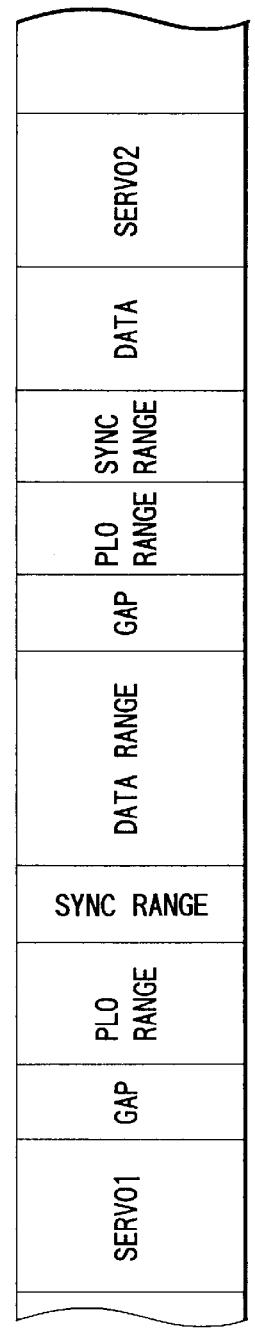
F I G. 14B

MAGNETIC DISK APPARATUS AND A THERMAL ASPERITY COMPENSATION METHOD OF THE SAME

BACKGROUND OF THE INVENTION

The present invention relates to a magnetic disk apparatus having a magnetoresistive element type head (MR head) as a signal reproducing head, and a thermal asperity compensation method of the same.

In recent years, magnetoresistive element type heads which have more excellent signal reproducing characteristics than those of magnetic thin-film heads have frequently been used to reproduce signals recorded in a medium. The MR head utilizes a characteristic in which a change in magnetization changes the electrical resistance upon application of the magnetic field to the magnetoresistive element. This MR head reproduces signal recorded in the medium by converting a change in magnetization upon reversal of the magnetization on the medium into a change in electrical resistance, and converting the change in electrical resistance into a change in voltage.

Such an MR head has the advantage of excellent signal reproducing characteristic. However, the waveform of the reproduced signal is distorted by heat generated by, e.g., contact between the MR head and the magnetic medium. This phenomenon is called thermal asperity (TA). Details of the TA are described in IEEE, Transaction Magnetics, Vol. 27, No. 6, Nov. 1991, pp.4503 to 4508.

Any waveform distortion of the reproduced signal causes an error in data finally obtained. The waveform distortion continues until the heat generated in the MR element is radiated. For this reason, the influence of an error caused by the TA increases in a magnetic disk apparatus having a higher transfer rate.

Although various error correction methods such as error correction using a Reed-Solomon code can be considered, there is no method having an error correction ability capable of properly and sufficiently removing the influence of the TA.

BRIEF SUMMARY OF THE INVENTION

The present invention has been made in consideration of the above situation, and has as its object to provide a magnetic disk apparatus in which the influence of the thermal asperity can be properly and sufficiently suppressed and the recording density can be increased, and a thermal asperity compensation method of the same.

According to one aspect of the invention, there is provided a magnetic disk apparatus comprising:

reproducing means for reproducing a signal recorded in a medium and outputting a reproduced signal;

reproduced signal pressing means, having a thermal asperity (TA) cancel filter, a variable gain amplifier (VGA), an automatic gain control (AGC), and a phase-locked loop (PLL), for processing the reproduced signal output from the reproducing means;

TA detection level setting means for setting a TA detection level;

TA detecting means for detecting a TA component from the reproduced signal by using the detection level set by the TA detection level setting means;

resistance value setting means for setting a resistance value of a rheostat of the TA cancel filter;

AGC hold time setting means for setting a TA hold time of the AGC;

PLL hold time setting means for setting a TA hold time of the PLL;

sync byte detecting means for detecting sync byte data in accordance with a format in which a plurality of sync byte data ranges are arranged to be separated from each other; and a central processing unit (CPU) for controlling the TA detection level setting means, the TA detecting means, the resistance value setting means, the AGC hold time setting means, the PLL hold time setting means, and the sync byte detecting means.

According to another aspect of the invention, there is provided a thermal asperity compensation method of a magnetic disk apparatus for reproducing a signal recorded in a medium with reproducing means, and processing the signal with reproduced signal processing means including a thermal asperity (TA) cancel filter, a variable gain amplifier (VGA), an automatic gain control (AGC), and a phase-locked loop (PLL), comprising:

a TA detection level setting step of setting a TA detection level;

a resistance value setting step of setting a resistance value of a rheostat of the TA cancel filter;

an AGC hold time setting step of setting a TA hold time of the AGC;

a PLL hold time setting step of setting a TA hold time of the PLL;

a TA detection step of detecting a TA component from the reproduced signal by using the detection level set in the TA detection level setting step; and a control step of integrally controlling the reproduced signal processing means in accordance with a TA compensation mode when generation of TA is detected in the TA detection step.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram showing a magnetic disk apparatus according to the first embodiment of the present invention;

FIG. 2 is a flow chart showing the operation of a reproduced signal processing controller according to the first embodiment;

FIG. 3 is a block diagram showing the arrangement of a TA detecting circuit according to the first embodiment;

FIG. 6 is a flow chart showing the operation of a TA compensation mode according to the first embodiment;

FIG. 7 is a block diagram showing the arrangement of a TA cancel filter according to the first embodiment;

FIGS. 8A and 8B are charts showing output waveforms from the TA cancel filter according to the first embodiment, respectively;

FIG. 9 is a flow chart showing the operation of the TA cancel filter according to the first embodiment;

FIG. 10 is a block diagram showing the arrangement of an AGC according to the first embodiment;

FIG. 11 is a flow chart showing the operation of the AGC according to the first embodiment;

FIG. 12 is a block diagram showing the arrangement of a PLL according to the first embodiment;

FIGS. 14A and 14B are views showing the format of a magnetic storage medium according to the first embodiment and a conventional format, respectively;

DETAILED DESCRIPTION OF THE INVENTION

Figure 4:
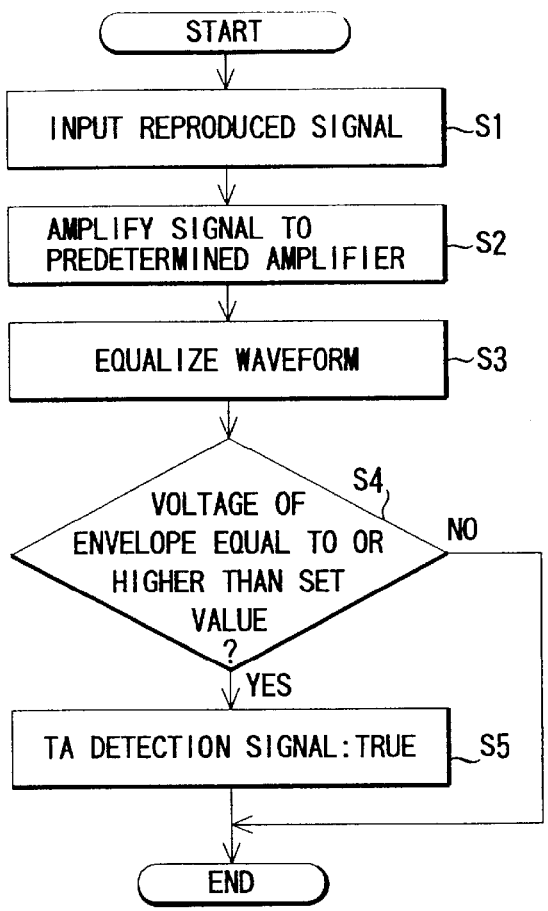
FIG. 4 is a flow chart showing the operation of the TA detecting circuit according to the first embodiment.

Embodiments of a magnetic disk apparatus according to the present invention will be described below with reference to the accompanying drawings. FIG. 1 is a block diagram showing the arrangement of the first embodiment.

A magnetic disk apparatus of the first embodiment comprises a reproducing system 100 for reproducing signals recorded in media 1, a reproduced signal processing controller 7 having a TA compensation mode to effectively control reproduced signal processing in accordance with generation of the TA, a reproduced signal processor 8 for processing the reproduced signal output from the reproducing system 100 under the control of the reproduced signal processing controller 7, and an HDC 10, as shown in FIG. 1.

The reproducing system 100 is constituted by a spindle motor 2 for driving and rotating the media 1, a reproducing head (MR head) 3 having a magnetoresistive element, a VCM driver 4 for controlling the rotation of the spindle motor 2, a carriage 5 for controlling the head positioning, and a preamplifier 6 for amplifying the signal reproduced by the MR head 3.

The MR head 3 reads as a signal a change in magnetization on the medium 1 which is driven and rotated, and outputs the signal to the preamplifier 6. The preamplifier 6 amplifies the signal reproduced by the MR head 3 and outputs it as a reproduced signal to the reproduced signal processor 8.

The reproduced signal processor 8 performs equalization processing using a filter and decoding processing using a decoder with respect to the reproduced signal output from the preamplifier 6 to obtain a 2- or 8-bit digital signal in a parallel NRZ (Non Return Zero) format and outputs it to the HDC 10. The reproduced signal processor 8 is constituted by a TA cancel filter 801, a variable gain amplifier (VGA) 802, an analog filter 803, an analog to digital converter (ADC) 804, a digital filter 805, a phaselocked loop (PLL) 806, an automatic gain control (AGC) 807, and a decoder 808.

The reproduced signal processor 8 employs a so-called partial response maximum likelihood (PRML) system. The PRML system is a signal processing system using a combination of partial response (PR) equalization for efficiently transmitting a digital signal by positively causing intersymbol interference in the received waveform in transmitting the digital signal, and maximum likelihood decoding (ML) such as Viterbi decoding for selecting a sequence that maximizes the probability density function in reproducing a data sequence whose correlation is calculated in advance. Compared to a so-called pulse peak detection method, the PRML system can record/reproduce a large amount of data in a narrow bandwidth.

The TA cancel filter 801 removes a TA component from the reproduced signal reproduced by the MR head 3 and amplified by the preamplifier 6. The reproduced signal from which the TA component is removed is controlled by the AGC 807 and amplified by the VGA 802 so as to have a predetermined amplitude. The amplified reproduced signal is controlled by the PLL 806, and its waveform is equalized by the analog filter 803, the ADC 804, and the digital filter 805. The reproduced signal whose waveform is equalized is decoded by the decoder 808 and output as NRZ data to the HDC 10.

In particular, to achieve a plurality of functions so as to suppress the influence of the TA, this embodiment comprises the following means. That is, the reproduced signal processing controller 7 comprises a TA detection level setting means for setting the TA detection level, a TA detecting means for detecting the TA component from the reproduced signal by using the detection level set by the TA detection level setting means, a resistance value setting means for setting the resistance value of the rheostat of the TA cancel filter 801, an AGC hold time setting means for setting the TA hold time of the AGC 807, a PLL hold time setting means for setting the TA hold time of the PLL 806, a sync byte detecting means for detecting sync byte data in accordance with the format in which a plurality of sync byte data are arranged to be separated from each other, and a central processing unit (CPU) 700 for integrally controlling these means.

When the TA detecting means detects generation of the TA, the reproduced signal processing controller 7 shifts to the TA compensation mode and controls the reproduced signal processor 8 in accordance with an operation defined in this mode. In this embodiment, the TA compensation mode defines the operation in which the ON control of the TA cancel filter 801, the TA hold control of the AGC 807, and the TA hold control of the PLL 806 are sequentially or simultaneously executed, and then sync byte detection is executed.

The reproduced signal processing controller 7 can give proper control amounts to integrally control targets specified in the reproduced signal processor 8 and control these control targets in the TA compensation mode. Therefore, the influence of the TA can be properly and sufficiently suppressed.

A detailed arrangement of each means of the reproduced signal processing controller 7 is as follows.

The TA detection level setting means is constituted by a TA detection level setting register 710 for holding a TA detection level value set by the CPU 700, and a DAC 711 for converting the value of the register into an analog signal. The DAC 711 outputs a signal S1 representing the TA detection level to a TA detecting circuit 712.

The TA detecting means is constituted by the TA detecting circuit 712 for detecting the TA component from the reproduced signal output from the analog filter 803 by using the TA detection level signal S1 output from the DAC 711. The TA detecting circuit 712 outputs the TA detection signal to the CPU 700 and the TA cancel filter 801.

The resistance value setting means is constituted by a resistance value setting register 720 for holding the resistance value of the rheostat of the TA cancel filter 801, and a DAC 721 for converting the value of the register into an analog signal. The DAC 721 outputs a signal S2 representing the resistance value to be set in the rheostat to the TA cancel filter 801.

The AGC hold time setting means is constituted by an AGC hold time setting register 730 for holding the TA hold time of the AGC 807 set by the CPU 700, and a timer 731 for outputting a TRUE signal on the basis of the value of the register. That is, the timer 731 outputs a true signal S3 to the AGC 807 in the TA hold period.

The PLL hold time setting means is constituted by a PLL hold time setting register 740 for holding the TA hold time of the PLL 806 set by the CPU 700, and a timer 741 for outputting a TRUE signal on the basis of the value of the register. That is, the timer 741 outputs a true signal S4 to the PLL 806.

Note that a single register may be used as both the AGC hold time setting register 730 and the PLL hold time setting register 740. Similarly, a single timer may be used for both the timers 731 and 741.

The sync byte detecting means is constituted by a sync byte detecting circuit 750 for receiving the reproduced signal output from the digital filter 805, detecting sync byte data in accordance with the format in which a plurality of sync byte data are arranged to be separated from each other, and outputting the detection result to the decoder 808 and the HDC 10.

The central processing unit 700 operates in accordance with a control program stored in a ROM (not shown) so as to efficiently operate each circuit having the above-described arrangement and effectively suppress the influence of the TA.

FIG. 2 is a flow chart showing the operation of the central processing unit 700.

First, upon turning on the power supply, setting of the resistance value of the TA cancel filter (step S100), setting of the TA detection level (step S101), and setting of the AGC/PLL hold time (step S102) are sequentially performed. In step S103, whether a read command is received is checked, and if YES in step S103, a read operation is started (step S104). That is, steps S101 and S102 are inevitably executed before executing the read command.

After the read operation is started in step S104, the presence/absence of TA detection is checked (in step S105).

Figure 5A:
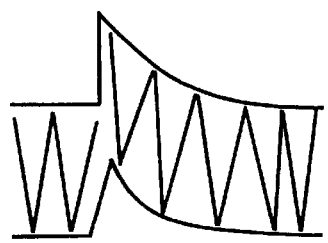
FIGS. 5A, 5B, and 5C are views showing various waveforms obtained by the TA detecting circuit according to the first embodiment, respectively.
Figure 5B:
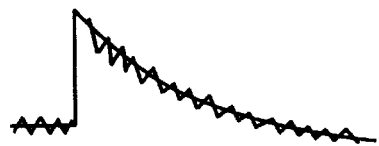
Figure 5C:
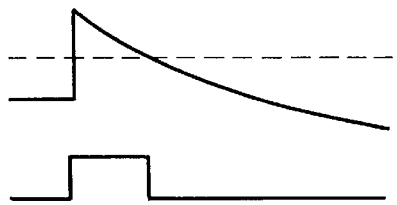

A detailed arrangement and operation of the TA detecting circuit 712 will be explained. FIG. 3 is a block diagram showing the arrangement of the TA detecting circuit 712 for detecting generation of the TA. FIG. 4 is a flow chart showing the operation of the TA detecting circuit 712. FIGS. 5A to 5C are views schematically showing the waveforms in the respective circuits of the TA detecting circuit 712.

As shown in FIG. 3, the TA detecting circuit 712 is constituted by an envelope detecting circuit 7121, a low-pass filter (LPF) 7122, and a comparator 7123.

The waveform of the reproduced signal input from the analog filter 803 to the TA detecting circuit 712 in step S1 is as shown in FIG. 5A. This signal is amplified to have a predetermined amplitude in step S2, and its waveform is equalized in step S3. The resultant signal is input to the envelope detecting circuit 7121, and its envelope is detected. Then, a signal as shown in FIG. 5B is output. After a high-frequency component is removed from this signal by the low-pass filter (LPF) 7122, the resultant signal is supplied to one input terminal of the comparator 7123.

On the other hand, the TA detection level signal S1 set by the CPU 700 and output via the TA detection level setting register 710 and the DAC 711 is supplied to the other input terminal of the comparator 7123. In step S4, as shown in FIG. 5C, the comparator 7123 detects whether the amplitude of the reproduced signal has a predetermined amplitude value, i.e., is larger than the TA detection level signal S1, and outputs a TA detection signal to the CPU 700 (and the TA cancel filter 801 though not shown; step S5).

Note that the TA detection signal makes it possible to detect the generation position of the TA. For example, a retry method can be changed in accordance with individual cases, e.g., when the TA is generated in the servo data portion (not shown) or generated in the data portion.

When an error in read data is occurred and the TA is detected, the CPU 700 shifts to the TA compensation mode (step S106). Upon execution of an operation concerning the TA compensation mode (to be described later), a read retry operation is performed. If no read error is occurred, the read operation is ended (step S107), and the CPU 700 shifts again to the read command reception determination process (step S103).

The operation concerning the TA compensation mode, i.e., the control operation of the reproduced signal processing controller 7 with respect to the reproduced signal processor 8 will be described in detail.

As shown in FIG. 6, when the TA compensation mode is started, the reproduced signal processing controller 7 sequentially or simultaneously executes the ON control of the TA cancel filter 801 in step S1001, the TA hold control of the AGC 807 in step S1002, and the TA hold control of the PLL 806 in step S1003.

The ON control of the TA cancel filter 801 in step S1001 will be explained.

FIG. 7 is a block diagram showing the arrangement of the TA cancel filter 801. As shown in FIG. 7, the TA cancel filter 801 is constituted by coupling capacitors C1 and C2, a voltage-controlled rheostat R, and an analog switching circuit SW1.

The output terminal of the DAC 721 coupled to the resistance value setting register 720 is connected to the rheostat R. With this arrangement, the resistance value of the rheostat R changes in accordance with the output from the DAC 721. The resistance value of the rheostat R is set such that the frequency calculable from the combination of the capacitors C1 and C2 and the rheostat R is lower than the frequency of the reproduced signal and higher than the frequency of the TA component.

The output terminal of the TA detecting circuit 712 is connected to the switching circuit SW1. With this arrangement, the switching circuit SW1 is turned on/off in accordance with detection of the TA.

The TA cancel filter 801 operates as a high-pass filter while the analog switching circuit SW1 is turned on in accordance with detection of the TA. Via the TA cancel filter 801, a predetermined low-frequency component of the reproduced signal input from the preamplifier 6 is attenuated. Since the frequency of the TA signal component is lower than that of a data signal, the TA component can be attenuated (canceled).

FIGS. 8A and 8B show waveforms exhibiting the TA cancel effect, in which FIG. 8A is a chart showing the waveform of the reproduced signal before performing TA cancel, and FIG. 8B is a chart showing the waveform of the reproduced signal after performing the TA cancel. As shown in FIG. 8B, the period in which the amplitude greatly varies is shortened after performing the TA cancel.

FIG. 9 is a flow chart showing the operation of the TA cancel filter 801 concerning the TA cancel.

First, in step S1, the resistance value of the rheostat R is set in accordance with the output from the DAC 721. In step S2, it is checked whether the TA detection signal output from the TA detecting circuit 712 represents TRUE. If YES in step S2, the switching circuit SW1 is turned on in step S3; and if NO in step S2, the switching circuit SW1 is turned off in step S4. That is, during a predetermined period in which the TA detection signal output from the TA detecting circuit 712 represents TRUE, the switching circuit SW1 is kept on. During this period, the TA cancel filter 801 operates as a high-pass filter to attenuate a low-frequency component corresponding to the TA component from the reproduced signal.

Next, the TA hold control of the AGC in step S1002 in the TA compensation mode shown in FIG. 6 will be explained.

FIG. 10 is a block diagram showing the arrangement of the AGC 807. The AGC 807 controls the VGA 802 so as to make the amplitude of the reproduced signal amplified constant. This control operation is held (TA hold) for a predetermined period upon generation of the TA.

The AGC 807 is constituted by a comparator 8071, a charge/discharge pump circuit 8072, and an analog switching circuit SW2.

The control operation for keeping the amplitude of the amplified signal constant is as follows. That is, the comparator 8071 checks whether the amplitude value of the reproduced signal amplified by the VGA 802 and sampled by the sample ADC 804 via the analog filter 803 is higher than the reference level. If it is determined that the amplitude value is higher than the reference level, the charge/discharge pump circuit 8072 discharges a predetermined amount of electric charges from a capacitor in accordance with the comparison result. With this operation, the voltage of a gain control signal decreases to decrease the gain, resulting in a decrease in gain of the VGA 802 by a predetermined amount. In this manner, the amplitude is kept constant.

FIG. 11 is a flow chart showing the AGC hold operation upon generation of the TA. The TA detection operation in steps S1 to S5 is the same as one described above, and a description thereof will be omitted.

If generation of the TA is detected in step S5, a TA cancel operation of the TA cancel filter 801 is performed. At the same time, in step S12, an AGC hold signal S3 set by the AGC hold time setting register 730 is output from the timer 731.

In step S14, the switching circuit SW2 operates for a predetermined period in response to the AGC hold signal S3 to hold the operation of the AGC 807. With this hold operation, any malfunction of the AGC 807 caused by the TA can be prevented.

The TA hold control of the PLL in step S1003 in the TA compensation mode shown in FIG. 6 will be explained.

The phase-locked loop (PLL) performs the control of the timing for sampling the reproduced signal, i.e., the phase control of sampling in synchronism with the reproduced signal. This control operation is held (TA hold) for a predetermined period upon generation of the TA.

FIG. 12 is a block diagram showing the arrangement of the PLL 806. The PLL 806 is constituted by a sample data phase comparing circuit 8061, a charge pump circuit 8062, an analog switching circuit SW3, and a voltage-controlled oscillator 8063.

The sample timing control operation is as follows. That is, the PLL 806 controls the sample frequency (the oscillation frequency of the oscillator 8063) so as to make two sample values equal. Since the reference signal of the PLL 806 is the amplitude value of data, two amplitude values are compared, and the charge pump circuit 8062 charges the capacitor in accordance with the difference. The oscillation frequency of the voltage-controlled oscillator 8063 is properly changed, and its frequency is adjusted to make the two amplitudes equal.

Figure 13:
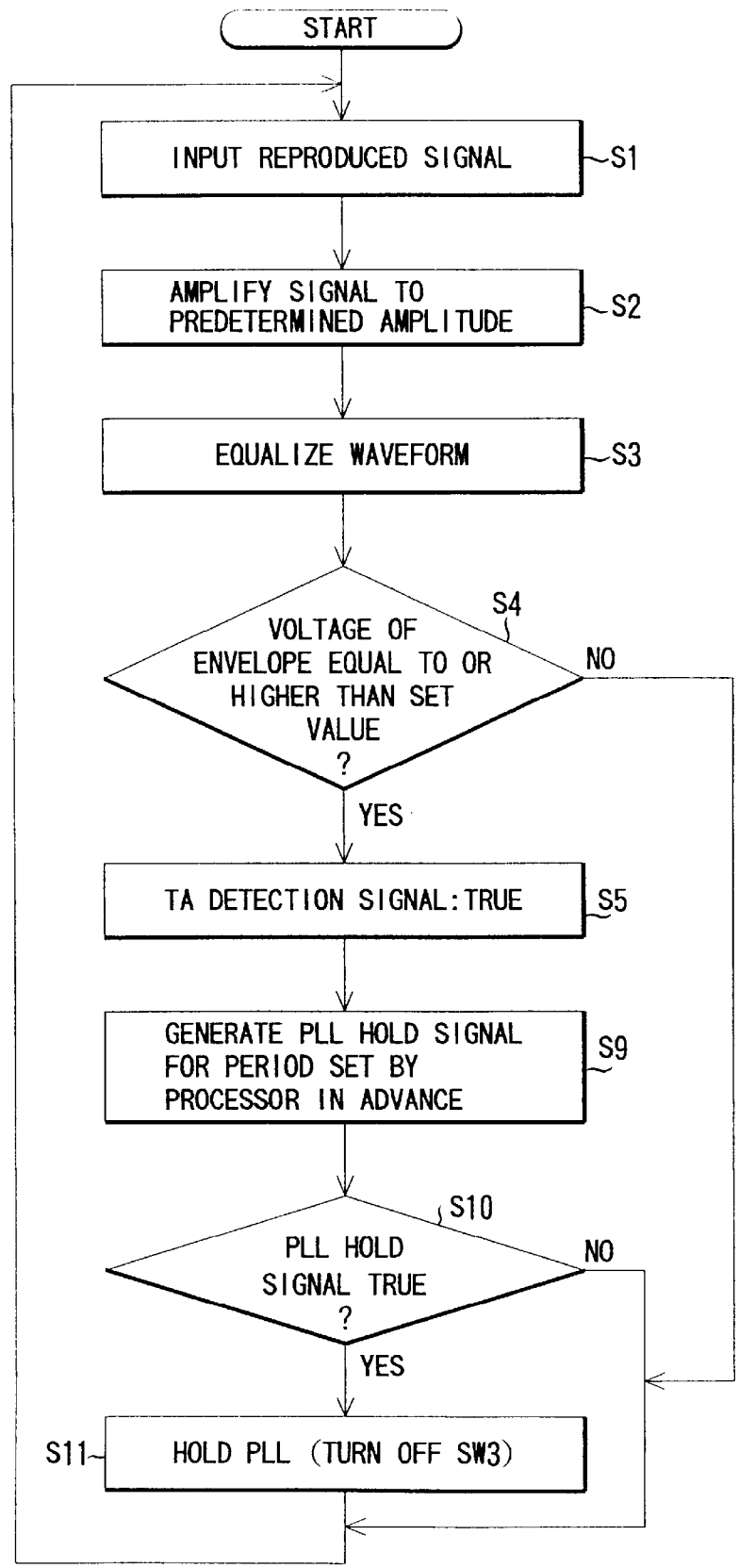
FIG. 13 is a flow chart showing the operation of the PLL according to the first embodiment.

FIG. 13 is a flow chart showing the TA hold operation of the PLL upon generation of the TA. The TA detection operation in steps S1 to S5 is the same as one described above, and a description thereof will be omitted.

When generation of the TA is detected in step S5, a TA cancel operation of the TA cancel filter 801 is performed. At the same time, in step S9, a PLL hold signal S4 set by the PLL hold time setting register 740 is output from the timer 741 to the switching circuit SW3. The PLL hold signal S4 is set in advance by the CPU 700.

In step S11, the switching circuit SW3 operates for a predetermined period in response to the PLL hold signal S4 to stop phase comparison of sample data by the phase comparing circuit 8061 for a predetermined period and hold the PLL 806. During this PLL hold period, the output terminal of the sample data phase comparing circuit 8061 is set to a high impedance, and the input of the voltage-controlled oscillator 8063 is fixed to fix the oscillation frequency.

This hold operation can prevent a shift in sample timing due to the influence of the TA. The shift in sample timing may result in data reproduction failure over a long period.

According to this embodiment, however, a proper sample timing can be generated, and therefore data can be properly and reliably reproduced.

Sync byte detection in step S1004 in the TA compensation mode shown in FIG. 6 will be explained.

FIGS. 14A and 14B schematically show a record format for the magnetic medium of the magnetic disk apparatus concerning suppression of the influence of the TA. FIG. 14A shows a record format according to the present invention, and FIG. 14B shows a conventional record format for comparison with the present invention.

As shown in FIG. 14A, the record format of the present invention has a frequency pull-in range in which regular data for generating a timing of sampling the amplitude of the data, the first sync mark range (SYNC1 range) indicating the start of data, a specific data range for avoiding a malfunction caused by the TA, the second sync mark range (SYNC2 range) indicating the start of data, and a recorded data range.

The first and second sync mark data ranges consist of data of at least 1 byte, and the specific data range consists of data of at least 2 bytes. The data contents to be recorded are as same as data in the PLO range.

In the conventional record format shown in FIG. 14B, a single sync mark range (SYNC range) is arranged between the PLO range and the data range. In the record format of the present invention, a plurality of sync mark ranges consisting of first and second sync mark data are arranged, and a specific data range for avoiding a malfunction caused by the TA is arranged between the two sync mark ranges.

The sync byte is data representing the boundary between the sample frequency pull-in range (PLO range) and the data range. In calculation of a normal error rate, the detection redundancy suffices to be about 1 byte for the sync byte length of 2 or 3 bytes. However, considering generation of the TA, the length is desirably 0.3 [$\mu$ s] or more upon conversion into time. As a general rule, the TA after the cancel operation desirably has a length with sufficient redundancy.

Figure 15:
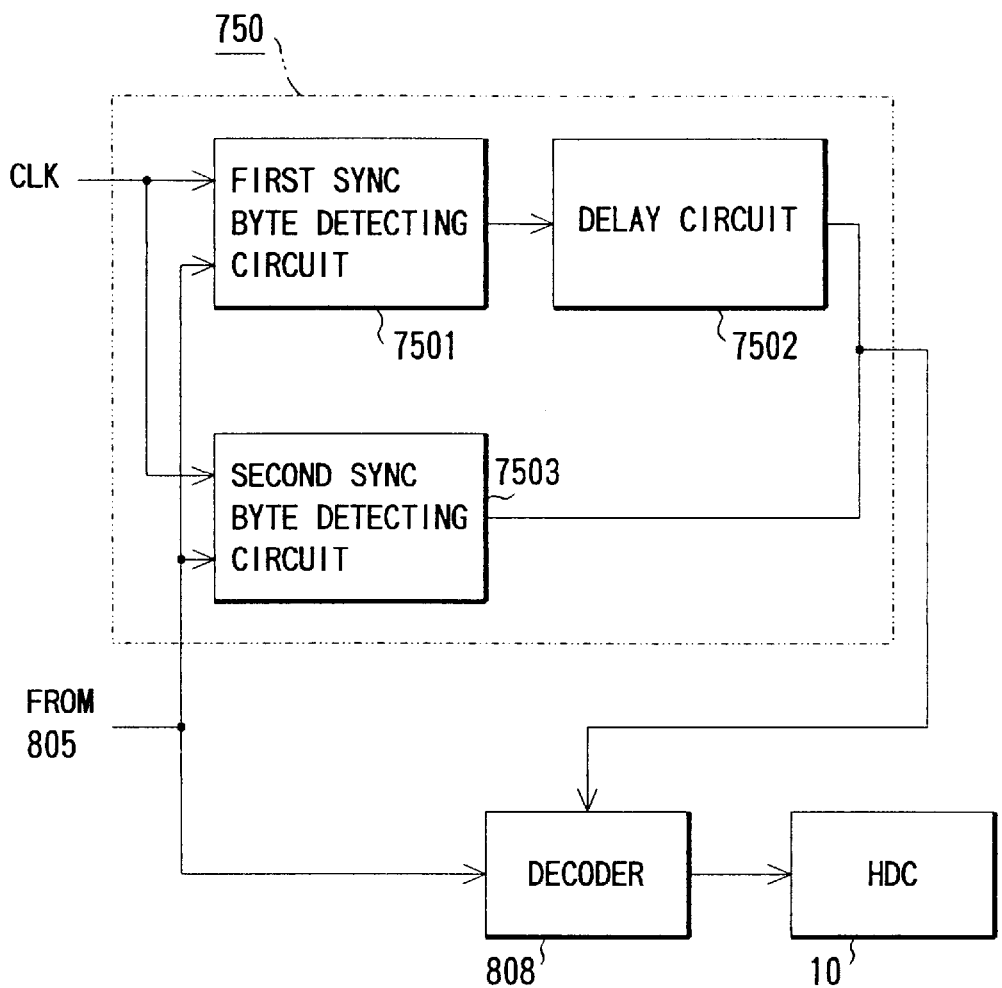
FIG. 15 is a block diagram showing the arrangement of a sync byte detecting circuit according to the first embodiment.

FIG. 15 is a block diagram showing the arrangement of the sync byte detecting circuit. The sync byte detecting circuit 750 is provided to the output stage of the digital filter 805, and constituted by a first sync byte detecting circuit 7501, a second sync byte detecting circuit 7503, and a delay circuit 7502. The sync byte detecting circuit 750 detects the sync byte and outputs it to the decoder 808.

In the sync byte detecting circuit 750, either of the first and second sync byte detecting circuits 7501 and 7503 detects either of the first and second two sync mark ranges described above, and outputs it to the decoder 808.

Upon detecting the SYNC1 range in the record format, the first sync byte detecting circuit 7501 outputs a detection signal. In this case, since the subsequent SYNC2 range is redundant, the delay circuit 7502 performs a delay operation. Upon detecting the SYNC2 range in the record format, the second sync byte detecting circuit 7503 outputs a detection signal.

As described above, in this format, a plurality of sync mark ranges consisting of first and second sync mark data are arranged, and a specific data range for avoiding a malfunction caused by the TA is arranged between the two sync mark ranges. With this arrangement, the influence of the TA in the sync mark range can be suppressed, adequate synchronization can be established, and the data range can be properly decoded.

According to this embodiment described above, various setting operations for a plurality of functions effective for suppressing the influence of the TA can be changed in a programmable manner. That is, setting of the detection level of the TA detecting circuit 712, setting of the resistance value to be given to the rheostat R of the TA cancel filter 801, setting of the TA hold time of the AGC 807, and setting of the TA hold time of the PLL 806 can be properly changed. In addition, for example, even when distortion of the waveform remains at the start portion of the TA upon passing through the TA cancel filter 801, which may affect the amplitude value of sample data, the influence of the TA can be sufficiently suppressed in the PLO frequency pull-in range and the AGC amplitude control range.

More specifically, the above-mentioned reproduced signal processing controller 7 can efficiently control the plurality of functions effective for TA compensation, which are incorporated in the reproduced signal processor 8. For this reason, the influence of the TA can be properly and sufficiently suppressed, and the error length of a data error sent from the reproduced signal processor 8 to the HDC 10 can be limited to a value equal to or smaller than the error length correctable in the HDC 10. This error is properly corrected by an error correction function in the HDC 10.

In this manner, since the influence of the TA can be suppressed, a magnetic disk apparatus having a higher recording density can be constructed.

Note that the order of various setting operations, i.e., the order of performing setting of the detection level of the TA detecting circuit, setting of the resistance value of the TA cancel filter, setting of the TA hold time of the PLL, and setting of the TA hold time of the AGC is not limited to the above one.

Next, the second embodiment of the present invention will be described. The same reference numerals as in the first embodiment denote the same parts in the description of the second embodiment, and a description thereof will be omitted.

In the first embodiment, the arrangement (the reproduced signal processor 8) of processing the reproduced signal from the MR head 3 in accordance with the PRML system is described. A magnetic disk apparatus of the second embodiment is constituted to process the reproduced signal in accordance with the decision feedback equalizer (DFE) system, instead of the PRML system.

Figure 16:
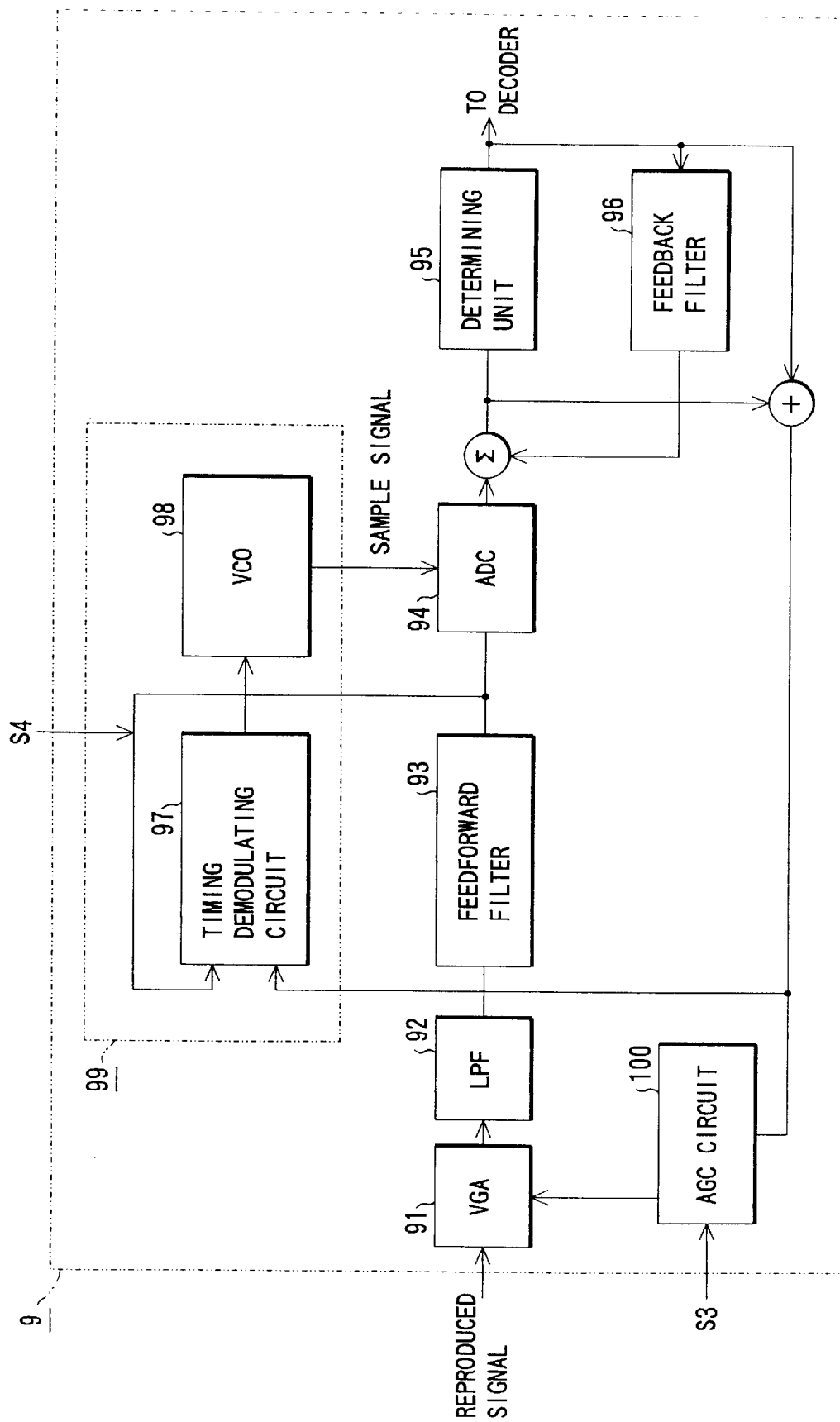
FIG. 16 is a block diagram showing the arrangement of a reproduced signal processor employing the DFE system in a magnetic disk apparatus according to the second embodiment of the present invention.

FIG. 16 is a block diagram showing the arrangement of a reproduced signal processor 9 employing the DFE system. As shown in FIG. 16, the reproduced signal processor 9 is constituted by a VGA 91, an LPF 92, a feedforward filter 93, an ADC 94, a determining unit 95, a feedback filter 96, a timing demodulating circuit 97, a VCO 98, and an AGC 100.

The reproduced signal processor 9 cancels the influence of intersymbol interference of current reproduced data by using the feedforward filter 93 and the feedback filter 96 and utilizing the previous reproduced data. With this processing, the signal-to-noise ratio (S/N) of the determining unit 95 can be improved.

Although not shown in this embodiment, the TA cancel filter 801 in the first embodiment is provided to the input stage of the VGA 9 and performs the TA cancel operation under the control of the resistance value setting means of the reproduced signal processing controller 7, as in the first embodiment.

The AGC 100 holds an operation for a predetermined period upon generation of the TA under the control of the reproduced signal processing controller 7, as in the first embodiment. That is, as shown in FIG. 16, an AGC hold signal S3 is input to the AGC 100.

A PLL 99 including the timing demodulating circuit 97 and the VCO 98 holds an operation for a predetermined period upon generation of the TA under the control of the reproduced signal processing controller 7, as in the first embodiment. That is, as shown in FIG. 16, a PLL hold signal S4 is input to the PLL 99.

According to this embodiment, therefore, a plurality of functions effective for TA compensation, which are incorporated in the reproduced signal processor 9, can be efficiently controlled by the reproduced signal processing controller 7, as in the first embodiment. Therefore, the influence of the TA can be properly and sufficiently suppressed, and the error length of a data error sent from the reproduced signal processor 9 to the HDC 10 can be limited to a value equal to or smaller than the error length correctable in the HDC 10.

As has been described above, according to the present invention, the influence of the TA can be properly and sufficiently suppressed, and the magnetic disk apparatus whose recording density can be improved can be provided.

The present invention is not limited to the above-described embodiments and can be modified without departing from the spirit and scope of the invention. For example, the processing system of the reproduced signal from the MR head 3 is not limited to the PRML system in the first embodiment and the DFE system in the second embodiment, and various reproduced signal processing systems may be employed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. A magnetic disk apparatus comprising:
    reproducing means for reproducing a signal recorded in a medium and outputting a reproduced signal;
    reproduced signal processing means, having:
        a thermal asperity (TA) cancel filter for attenuating a TA component contained in the reproduced signal output from said reproducing means,
        a variable gain amplifier (VGA) for amplifying an output signal from the TA cancel filter at a variable amplifying rate,
        an automatic gain control (AGC) for controlling the amplifying rate of the VGA on the basis of an amplitude of the output signal from the TA cancel filter thus keeping an output signal from the VGA at a constant voltage level,
        an analog filter for subjecting the output signal from the VGA to a predetermined filtering process,
        an analog to digital converter (ADC) for converting the filtered signal from the analog filter into a digital signal in accordance with a reference clock,
        a digital filter for subjecting the output from the ADC to a predetermined signal process, and outputting a digital data, and
        a phase-locked loop (PLL) for generating the reference clock on the basis of the digital data from the digital filter;
    TA detection level setting means for setting a TA detection level;
    TA detecting means for detecting a TA component from the reproduced signal by using the detection level set by said TA detection level setting means;
    resistance value setting means for setting a resistance value of a rheostat of said TA cancel filter;
    AGC hold time setting means for setting a TA hold time of said AGC;
    PLL hold time setting means for setting a TA hold time of said PLL;
    sync byte detecting means for detecting sync byte data having a predetermined specific pattern from the digital data output from the digital filter; and
    a central processing unit (CPU) for controlling said TA detection level setting means, said TA detecting means, said resistance value setting means, said AGC hold time setting means, said PLL hold time setting means, and said sync byte detecting means.

2. An apparatus according to claim 1, wherein said CPU comprises:
    control means for integrally controlling said reproduced signal processing means in accordance with a TA compensation mode when said TA detecting means detects generation of TA.

3. An apparatus according to claim 2, wherein said control means comprises:
    means for sequentially or simultaneously executing control of said TA cancel filter, TA hold control of said AGC, and TA hold control of said PLL; and
    means for decoding a plurality of sync bytes and executing sync byte detection.

4. An apparatus according to claim 1, wherein said TA detection level setting means comprises:
    a detection level setting register having a detection level set by said CPU; and
    a digital to analog converter (DAC) for converting a value of the detection level set by said register into an analog signal, and outputting the analog signal to said TA detecting means.

5. An apparatus according to claim 1, wherein said TA detecting means comprises:
    an envelope detecting circuit for receiving the reproduced signal;
    a low-pass filter (LPF) coupled to said envelope detecting circuit; and
    a comparator for comparing the detection level set by said TA detection level setting means with an output from said LPF.

6. An apparatus according to claim 1, wherein said resistance value setting means comprises:
    a resistance value setting register having a resistance value set by said CPU; and
    a digital to analog converter (DAC) for converting the resistance value set by said register into an analog signal, and outputting the analog signal to said TA cancel filter.

7. An apparatus according to claim 1, wherein said AGC hold time setting means comprises:
    an AGC hold time setting register having an AGC hold time set by said CPU; and
    a timer for outputting a TRUE signal during the hold time set by said register.

8. An apparatus according to claim 1, wherein said PLL hold time setting means comprises:
    a PLL hold time setting register having a PLL hold time set by said CPU; and
    a timer for outputting a TRUE signal during the hold time set by said register.

9. An apparatus according to claim 1, wherein said sync byte detecting means comprises:
    a first sync byte detecting circuit for detecting a first specific pattern contained in the digital data output from the digital filter;
    a second sync byte detecting circuit for detecting a second specific pattern contained in the digital data; and
    means for detecting a top position of data following said second specific pattern.

10. A magnetic disk apparatus comprising:
    reproducing means for reproducing a signal recorded in a medium with a magnetoresistive element and outputting a reproduced signal;
    detecting means, having a predetermined detection level, for detecting thermal asperity from the reproduced signal;
    attenuating means for attenuating a predetermined low-frequency component of the reproduced signal output from said reproducing means in order to remove a thermal asperity component;
    variable gain amplifying means for amplifying the reproduced signal output from said attenuating means by using a variable gain;

gain control means for controlling the gain of said variable gain amplifying means so as to make an amplitude of the reproduced signal output from said variable gain amplifying means constant;

first hold means for holding gain control by said gain control means for a first predetermined period upon detection of the thermal asperity by said detecting means;

sample means for sampling thee reproduced signal output from said variable gain amplifying means at a predetermined timing;

phase control means for controlling a phase of sampling by said sample means so as to synchronize the sampling phase with the reproduced signal;

second hold means for holding phase control of said phase control means for a second predetermined period upon detection of the thermal asperity by said detecting means; and control means for controlling the detection level of said detecting means, an attenuation property of said attenuating means, the first predetermined period of said first hold means, and the second predetermined period of said second hold means.

11. A method of compensating thermal asperity using a magnetic disk apparatus that includes:

reproducing means for reproducing a signal recorded in a medium and outputting a reproduced signal;

reproduced signal processing means having:
- a thermal asperity (TA) cancel filter for attenuating a TA component contained in the reproduced signal output from said reproducing means,
- a variable gain amplifier (VGA) for amplifying an output signal from the TA cancel filter at a variable amplifying rate,
- an automatic gain control (AGC) for controlling the amplifying rate of the VGA on the basis of an amplitude of the output signal from the TA cancel filter thus keeping an output signal from the VGA at a constant voltage level,
- an analog filter for subjecting the output signal from the VGA to a predetermined filtering process,
- an analog to digital converter (ADC) for converting the filtered signal from the analog filter into a digital signal in accordance with a reference clock,
- a digital filter for subjecting the output from the ADC to a predetermined signal process, and outputting a digital data, and
- a phase-locked loop (PLL) for generating the reference clock on the basis of the digital data from the digital filter;

wherein the method comprises the steps of:
setting a TA detection level;
setting a resistance value of a rheostat of said cancel filter;
setting a TA hold time of said AGC;
setting a TA hold time of said PLL; and
detecting a TA component from the reproduced signal by using the detection level set in the TA detection level setting step.

12. A method according to claim 11, wherein the control step includes the step of sequentially or simultaneously executing control of said TA cancel filter, TA hold control of said AGC, and TA hold control of said PLL.

13. A thermal asperity compensation method of a magnetic disk apparatus, comprising the steps of:

converting information recorded in a magnetic storage medium into an electrical signal by using a magnetoresistive element, and reproducing the information on the basis of the electrical signal, said electrical signal including thermal asperity;

amplifying the electrical signal from said magnetoresistive element by a first amplifying circuit;

amplifying the signal amplified by said first amplifying circuit by a second amplifying circuit such that an amplitude of an output from the second amplifying circuit is kept constant;

detecting the thermal asperity of the signal amplified by said second amplifying circuit in accordance with a predetermined detection level;

compensating for the thermal asperity using a filter having a characteristic of attenuating a thermal asperity component with a predetermined low-frequency range attenuation characteristic;

holding a control operation of a sample timing by a PLL circuit for a predetermined PLL hold time upon detection of the thermal asperity; and holding a control operation for keeping the amplitude of the signal amplified by said second amplifying circuit constant for a predetermined AGC hold time upon detection of the thermal asperity.

* * * * *